(12) United States Patent
Gordon et al.

(10) Patent No.: US 11,105,691 B2
(45) Date of Patent: Aug. 31, 2021

(54) SELF-REGULATING HEATING SYSTEM FOR A TOTAL AIR TEMPERATURE PROBE

(71) Applicant: Honeywell International Inc., Morris Plains, NJ (US)

(72) Inventors: Grant Gordon, Peoria, AZ (US); Nicholas A. Everson, Phoenix, AZ (US); Morris Anderson, Mesa, AZ (US); Merle L Sand, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 452 days.

(21) Appl. No.: 15/941,520

(22) Filed: Mar. 30, 2018

(65) Prior Publication Data

US 2019/0301949 A1 Oct. 3, 2019

(51) Int. Cl.
*H05B 3/00* (2006.01)
*G01K 13/02* (2021.01)
*G01K 1/08* (2021.01)

(52) U.S. Cl.
CPC ............ *G01K 13/028* (2013.01); *G01K 1/08* (2013.01); *H05B 2203/022* (2013.01)

(58) Field of Classification Search
CPC .... G01K 13/02; G01K 13/022; G01K 13/024; G01K 13/026; G01K 13/028; G01K 1/08;

(Continued)

(56) References Cited

U.S. PATENT DOCUMENTS

| 2,588,840 A | 3/1952 | Howland |
| 2,984,107 A * | 5/1961 | Strieby ................. B64D 15/12 |
| | | 73/312 |

(Continued)

FOREIGN PATENT DOCUMENTS

| EP | 1491900 A2 | 12/2004 |
| EP | 1837636 A1 | 9/2007 |

(Continued)

OTHER PUBLICATIONS

Nagabhushana et al, "Aircraft Instrumentation and Systems" Pages: Cover, Title, 70-71, Publisher: I.K. International Publishing House Pvt. Ltd.

(Continued)

*Primary Examiner* — Sang Y Paik
(74) *Attorney, Agent, or Firm* — Fogg & Powers LLC (57) ABSTRACT

A total air temperature (TAT) probe having a self-regulating heating system is provided. A TAT probe housing includes at least one heating cavity that is located proximate to a tip of the TAT probe. A heating element is received within the at least one heating cavity. The heating element is composed from a flexible material with a very high positive temperature coefficient (PTC) that provides non-linear resistance with temperature with generally relatively low electrical resistances at temperatures below freezing and relatively high electrical resistances above freezing. A power source is coupled to the heating element. The very high PTC material of the heating element causes less power to be drawn by the heating element from the power source at higher temperatures above freezing than the power drawn by the heating element from the power source at lower temperatures below freezing to maintain a desired temperature of the TAT probe.

20 Claims, 6 Drawing Sheets

(58) Field of Classification Search
CPC .... G05D 23/24; G05D 23/2401; G05D 23/26; H05B 2203/19; H05B 2203/02; H05B 2203/022; H05B 2203/023
See application file for complete search history.

(56) References Cited

U.S. PATENT DOCUMENTS

| | | | |
|---|---|---|---|
| 3,170,328 | A | 2/1965 | Werner et al. |
| 4,121,088 | A | 10/1978 | Doremus et al. |
| 4,458,137 | A | 7/1984 | Kirkpatrick |
| 4,775,778 | A * | 10/1988 | van Konynenburg ... C08K 3/04 219/549 |
| 5,653,538 | A | 8/1997 | Phillips |
| 5,824,996 | A * | 10/1998 | Kochman .......... A41D 13/0051 219/529 |
| 6,070,475 | A * | 6/2000 | Muehlhauser ............ G01F 1/46 374/E13.006 |
| 6,076,963 | A | 6/2000 | Menzies et al. |
| 6,609,825 | B2 | 8/2003 | Ice et al. |
| 6,702,233 | B1 | 3/2004 | DuPont |
| 7,053,344 | B1 | 5/2006 | Sudan et al. |
| 7,174,782 | B2 | 2/2007 | Ice |
| 7,328,623 | B2 | 2/2008 | Slagle et al. |
| 7,357,572 | B2 | 4/2008 | Benning et al. |
| 7,441,948 | B2 | 10/2008 | Bernard et al. |
| 7,984,647 | B2 | 7/2011 | Severson et al. |
| 8,104,955 | B2 | 1/2012 | Benning et al. |
| 8,806,934 | B2 | 8/2014 | Goedel |
| 8,864,370 | B2 | 10/2014 | Dijon et al. |
| 9,243,963 | B2 | 1/2016 | Thorpe et al. |
| 9,429,481 | B2 | 8/2016 | Agami |
| 2003/0005779 | A1 | 1/2003 | Bernard |
| 2004/0017763 | A1 | 1/2004 | Tawa et al. |
| 2005/0066722 | A1 | 3/2005 | Magnin |
| 2006/0056489 | A1 | 3/2006 | Bernard et al. |
| 2007/0029309 | A1 * | 2/2007 | Keite-Telgenbuscher .................. C09J 11/04 219/549 |
| 2007/0220984 | A1 | 9/2007 | Slagle et al. |
| 2008/0285620 | A1 | 11/2008 | Benning et al. |
| 2009/0154522 | A1 | 6/2009 | Kulczyk |
| 2013/0022076 | A1 | 1/2013 | Dijon et al. |
| 2014/0064330 | A1 | 3/2014 | Agami |
| 2014/0169403 | A1 | 6/2014 | Nakamura |
| 2015/0063414 | A1 | 3/2015 | Wigen et al. |
| 2015/0103863 | A1 | 4/2015 | Herman |
| 2016/0238456 | A1 | 8/2016 | Wigen |
| 2016/0377487 | A1 * | 12/2016 | Cheung ................. G01K 13/02 374/141 |
| 2017/0106993 | A1 | 4/2017 | Anderson et al. |
| 2017/0257910 | A1 | 9/2017 | Oldenzijl et al. |
| 2018/0143082 | A1 | 5/2018 | Anderson et al. |
| 2018/0188118 | A1 | 7/2018 | Anderson et al. |

FOREIGN PATENT DOCUMENTS

| | | |
|---|---|---|
| EP | 2863195 A1 | 4/2015 |
| EP | 2866011 A1 | 4/2015 |
| EP | 3056884 A1 | 8/2016 |

OTHER PUBLICATIONS

Zeng et al, "Positive Temperature Coefficient Thermistors Based on Nanotube/polymer composites", "Science Reports.2014:4:6684", "doi: 10.1038/srep06684", Dated Oct. 20, 2014, pp. 1-12, Publisher: Macmillan Publishers Limited.
Anderson et al., "Systems and Methods for Icing Resistant Total Air Temperature Probes", U.S. Appl. No. 15/359,442, pp. 1-23, Published on Nov. 22, 2016.
European Patent Office, "Extended European Search Report from EP Application No. 17201974.7 dated Apr. 9, 2018", from Foreign Counterpart to U.S. Appl. No. 15/359,442, pp. 1-9, Published: EP.
European Patent Office, "Extended European Search Report from EP Application No. 19165047.2 dated Aug. 28, 2019", from Foreign Counterpart to U.S. Appl. No. 15/941,520, pp. 1-8, Published: EP.
U.S. Patent and Trademark Office, "Notice of Allowance", U.S. Appl. No. 15/359,442, dated Apr. 17, 2019, pp. 1-17, Published: US.
U.S. Patent and Trademark Office, "Office Action", U.S. Appl. No. 15/359,442, dated Oct. 4, 2018, pp. 1-19, Published: US.
"Resistance Thermometer", at least as early as Jun. 8, 2020, p. 1 through 3, https://citcuitglobe.com/resistance-thermometer.html.
European Patent Office, "Communication pursuant to Article 94(3) EPC from EP Application No. 19165047.2", from Foreign Counterpart to U.S. Appl. No. 15/941,520, dated Jun. 8, 2020, p. 1 through 5, Published: EP.
European Patent Office, "Communication pursuant to Article 94(3) EPC from EP Application No. 19165047.2", from Foreign Counterpart to U.S. Appl. No. 15/941,520, dated Feb. 8, 2021, p. 1 through 5, Published: EP.

* cited by examiner

SELF-REGULATING HEATING SYSTEM FOR A TOTAL AIR TEMPERATURE PROBE

BACKGROUND

Static Air Temperature (SAT), also known as ambient or Outside Air Temperature (OAT), is an essential parameter used by the flight and engine management systems of modern jet powered aircraft. It is the temperature of the air around the aircraft that is unaffected by the passage of the plane through the air mass. When flying on a clear day at low altitudes and low speeds the measurement of SAT can be made directly. But when traveling at Mach 0.2 or higher the act of bringing the air to rest to sense it causes compression and a commensurate adiabatic increase in temperature. The measurement of this stagnation air temperature is known as the Total Air Temperature (TAT) and it provides a measure that can be convert back to SAT to further calculate True Air Speed (TAS) and other critical parameters.

The measurement of TAT is the function of a TAT probe that is mounted on the aircraft and exposed to the airflow. The TAT probe must be capable of making these measurements under a variety of demanding environmental conditions including super cooled rain and ice crystal conditions. Heaters mounted inside the TAT probes provide the necessary thermal power to keep the probe ice free. But they must do this while minimizing heat transfer into stagnated air brought into the probe for measurement. To accomplish this the probes is designed to minimize the influence of the heated housing on air sensing elements of the TAT probe. But this is a challenging task and the demands for temperature accuracy are tight. For example the COMAC C919 requires a TAT Probe to provide an accurate measure of temperature with no more than ±0.50° C. of error over the temperature range of −50° C. to +150° C. when deicing heat is not active.

One common approach to minimizing the de-icing heat error is to determine the correction function needed to compensate for the measured temperature when the heater is active. But the amount of heat that the sensor experiences when the heater is turned on will depend on the amount of heat extract due to the environmental cooling of the probe. So further methods use additional sensors to measure the heated probe body to control the heater to minimize the excess heat or to provide feedback to the correction factor. These approaches require the use of additional sensing elements, electronics for feedback circuits and control algorithms. However, in order to ensure robust long term operation, there is a desire to limit electronic components and devices in the probe.

SUMMARY

The following summary is made by way of example and not by way of limitation. It is merely provided to aid the reader in understanding some of the aspects of the subject matter described. Embodiments provide a robust, low complexity, electronics free TAT probe that can provide high accuracy temperature measurement with and without the heater turned on with the use of very high positive temperature coefficient heating elements.

In one embodiment, a total air temperature (TAT) probe having a self-regulating heating system that includes a TAT probe, a heating element and a power source is provided. The TAT probe housing includes at least one heating cavity. The at least one heating cavity includes a heating cavity that is located proximate to a tip of the TAT probe. The heating element is received within the at least one heating cavity. The heating element is composed from a flexible material with a very high positive temperature coefficient (PTC) that provides non-linear resistance with temperature with generally relatively low electrical resistances at temperatures below freezing and relatively high electrical resistances above freezing. The power source is coupled to the heating element. The very high PTC material of the heating element causes less power to be drawn by the heating element from the power source at higher temperatures above freezing than to be drawn by the heating element from the power source at lower temperatures below freezing in order to maintain a desired temperature of the TAT probe.

In another example embodiment, another TAT probe having a self-regulating heating system is provided. The TAT includes a temperature sensor element, a TAT probe housing, at least one heating element and at least one power source. The TAT probe housing contains the temperature sensor element. The TAT probe housing includes a distal end. The TAT probe housing has an inlet passage extending from the distal end of the TAT probe to the sensor element. The TAT probe further has at least one heating cavity. One heating cavity of the at least one heating cavity is positioned at least partially around the inlet passage. The at least one heating element is positioned within the at least one heating cavity. The at least one heating element is formed from a flexible material with a very high positive temperature coefficient (PTC) providing non-linear resistance with temperature with generally relatively low electrical resistances at temperatures below freezing and relatively high electrical resistances above freezing. The at least one power source is coupled to provide a current flow through the at least one heating element as allowed by the at least one heating element.

In yet another embodiment, a method for forming a TAT probe having a self-regulating heating system is provided. The method includes shaping at least one heating element having a flexible material with a very high positive temperature coefficient (PTC) providing non-linear resistance with temperature with generally relatively low electrical resistances at temperatures below freezing and relatively high electrical resistances above freezing. The at least one heating element is positioned in at least one cavity in a housing of the TAT probe. One of the at least one cavity is positioned adjacent an inlet passage extending from a distal end of the housing of the TAT probe to a sensor element. At least one power source is coupled to the at least one heating element.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
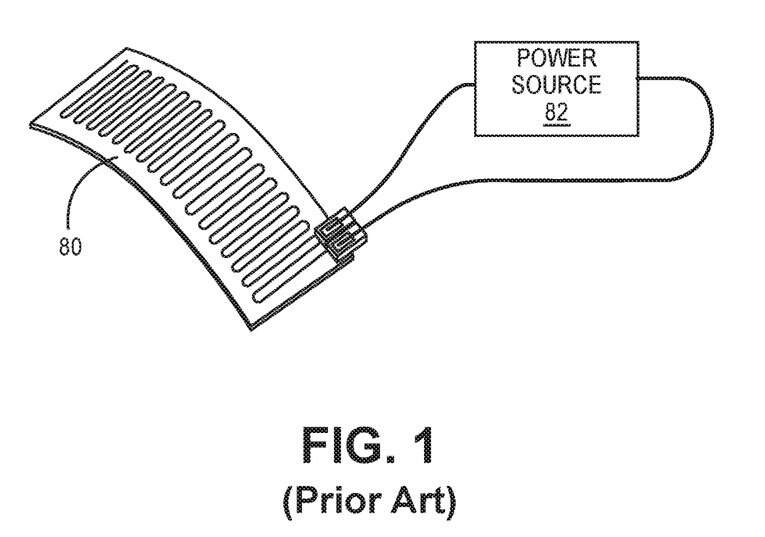
FIG. 1 is an illustration of a flexible thin film heating element made of very high positive temperature coefficient (PTC) of the prior art.

Embodiments provide a flexible thin film heating element that has a very high positive temperature coefficient (PTC) in a total air temperature (TAT) probe to prevent ice buildup on the TAT probe. Material with a high PTC will have a low electrical resistance at low temperature and a high electrical resistance at high temperatures. A basic feature of the heater material is that it is self-limiting or self-protecting. Referring to FIG. 1 an example flexible thin film heating element 80 is illustrated. As illustrated, the example flexible thin film heating element 80 is coupled to a power source 82.

As discussed above, the heating element 80 in embodiments is made from PTC material. An example of PTC material is a thin foils of PTC elastomeric material made by the Conflux Company of Bruttovagen Sweden that is distributed by Minco Products, Inc. under the product name SmartHeat SLT™. The heating element 80 made from the PTC material cannot overheat and requires no regulating or safety electronics. Moreover, the heating elements are self-regulating and self-limiting at all locations across the active surface. The elastomeric material conducts current and produces heat up to a temperature given by the elastomeric material recipe.

Figure 2:
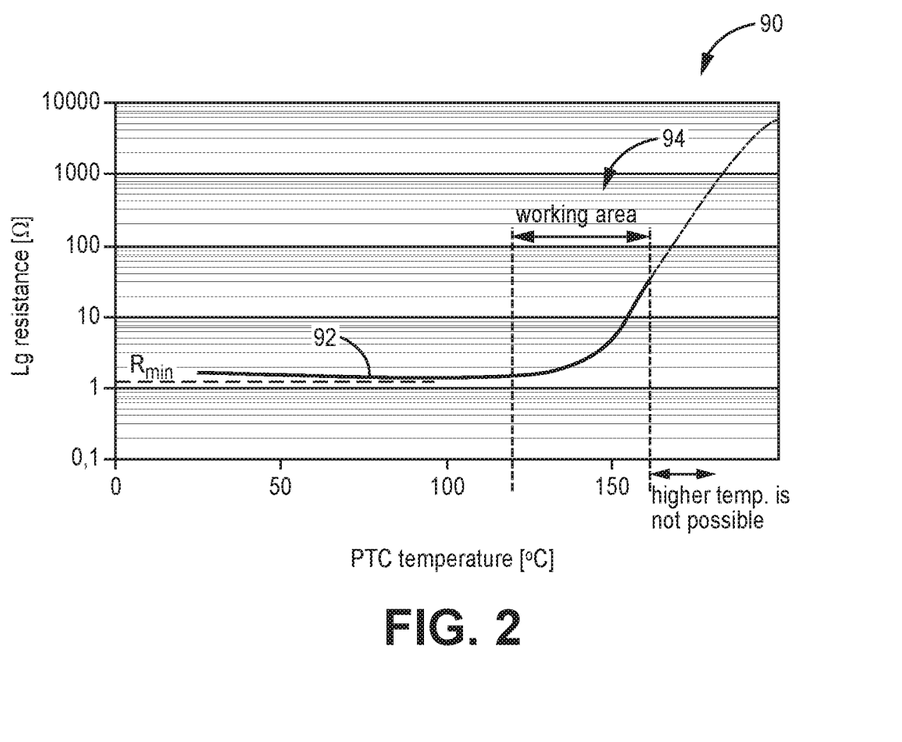
FIG. 2 is a resistance vs temperature graph of a heating element made of very high PTC.

Referring to FIG. 2, a resistance vs temperature graph 90 of PTC material is illustrated. As the heater operates, it increases its temperature which in turn increases its resistance as indicated by 92. The increase in resistance reduces the current that is drawn. The reduction in current further limits the joule heating that the heater produces. By varying the composition of the heating element 80 the working area 94 shown in FIG. 2 can be adjusted. In this way the heater can be designed to operate at a constant temperature without the need of a heater control. Essentially the heater control is intrinsic to the heating element 80 itself through the use of the highly PTC material.

TAT probe embodiments using a heater element 80 described above are more accurate, less complex, electronics free, robust and lower cost as compared to TAT probes made with complex heater controllers or other approaches for reduced de-icing heat error. Electronic free design is especially attractive to customers that desire air data sensors external to the airplane to be free of any electronic components or electronic devices.

Figure 3:
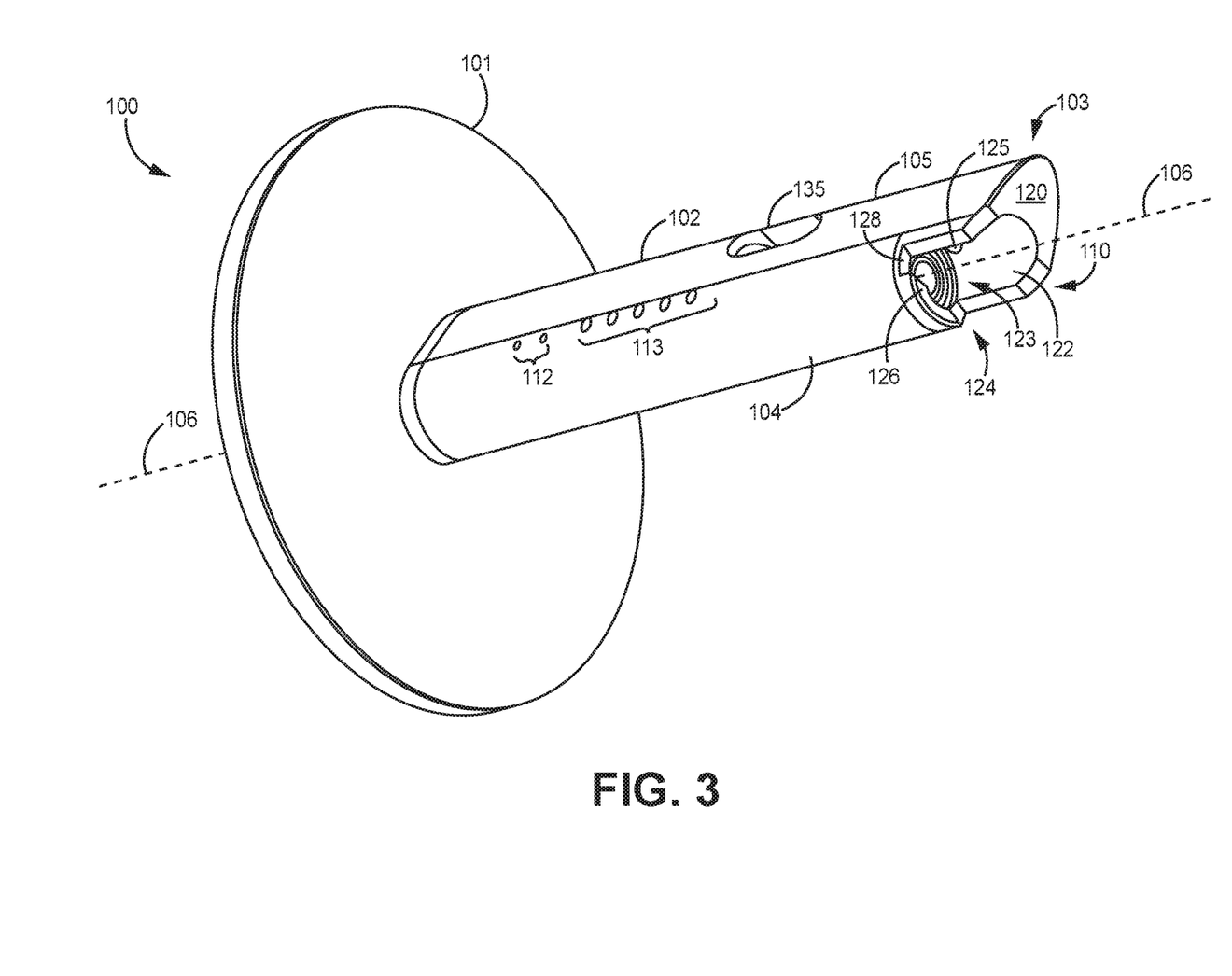
FIG. 3 is a side perspective view of a total air temperature (TAT) probe that includes a heating element according to an exemplary embodiment.

An example of a TAT probe 100 implementing a heating element that is made of PTC material in illustrated in FIG. 3. FIG. 3 illustrates a side perspective view of the TAT probe 100. Example TAT probe 100 includes a base member 101 and a probe body 102 (probe housing) that extends from the base member 101 along a first axis 106. In one embodiment the first axis 106 is aligned normal to a plane of the base member 101. Base member 101 is used to attach the TAT probe 100 to an aircraft fuselage or other surface of the aircraft.

The probe body 102 also includes a leading edge 104 which defines the portion of the surface of probe body 102 that faces into the airflow when the aircraft is in flight and a trailing edge 105 which defines the opposing back side of probe body 102 opposite to the leading edge 104. In alternate embodiments, the probe body 102 may be cylindrical, tapered, or of arbitrary shape.

The probe body 102 or housing may be substantially fabricated from a mass metal or other material which is structured to comprise the various internal and external features described herein. A distal end 103 of the probe body 102 comprises a notched intake port 110. The notched intake port 110 has an open channel 122 extending inward from a face 120 of the distal end 103 to feed air into an intake aperture 123. The notched intake port 110 in this example, further includes a cutaway region that defines a recessed second face 124 that is inset from the first face and exposes the open channel 122 at least partially to the leading edge 104. The notched intake port 110 further includes a slot 128 inset from the recessed face 124 that traverses across at least a portion of the intake aperture 123 perpendicularly to the open channel 122 and is separated from the leading edge 104 by a lip 126.

In flight, air generally flows around the sides of the probe body 102 from the leading edge 104 towards the trailing edge 105, except where the air collides with the notched intake port 110. The notched intake port 110 is shaped to produce a standing vortex that drives a portion of the airflow down the open channel 122 into the intake aperture 123, and the balance around and/or over the probe body 102. The notched intake port 110 causes a buildup of total pressure in the open channel 122 as the velocity of the airflow colliding with the notched intake port 110 translates into a region of increased pressure, slowing down the air and changing the airflow from air having a static air temperature to air having a total air temperature. The combination of the region of increased pressure along with the vortex created by the slot 128 encourages ambient air that has not been heated by contact with the probe to enter the intake aperture 123. This drives ice crystals away from the notched intake port 110 to prevent their accumulation. In one embodiment, the open channel 122 of the notched intake port 110 further comprises a weep hole 125 that extends through the probe body 102 to the trailing edge 105 so that water from ice that melts within the notched intake port 110 can exit the notched intake port 110 rather than enter into the working regions of probe body 102. Weep hole 125 allows water and air to flow from the notched intake port 110 out the trailing edge of the probe. In some implementations, the probe body 102 may further include an additional aperture on the leading edge 104 for measuring total pressure.

It should be understood that the present disclosure uses the term "total air temperature" as that term would be understood by those of ordinary skill in the fields of aviation and fluid dynamics. That is, a total air temperature is a measurement of a stream of air if it were brought to rest relative to the aircraft. A total air temperature is distinguished from a static air temperature. More specifically, total air temperature differs from static air temperature as a function of the square of airflow velocity. This relationship may be expressed by Bernoulli's Equation. For example, air which has been slowed due to impacting with the nose of an inflight aircraft will have a higher temperature than air that is flowing without obstruction along the side of an aircraft. Conversion of static air temperatures into total temperature in a sense normalizes temperature measurements by accounting for differences in airflow velocities as temperature measurements are obtained.

Air flowing into the intake aperture 123 travels along a plurality of interior airflow passages. Referring to the cross-section side view of the TAT probe 100 of FIG. 4. The example embodiment of FIG. 4 includes an air ejector generally designated as 300. The air ejector 300 includes an ejector inlet 210, a low pressor ejector chamber 226 and at least one ejector exhaust port (shown as 135 in FIG. 3).

Figure 4:
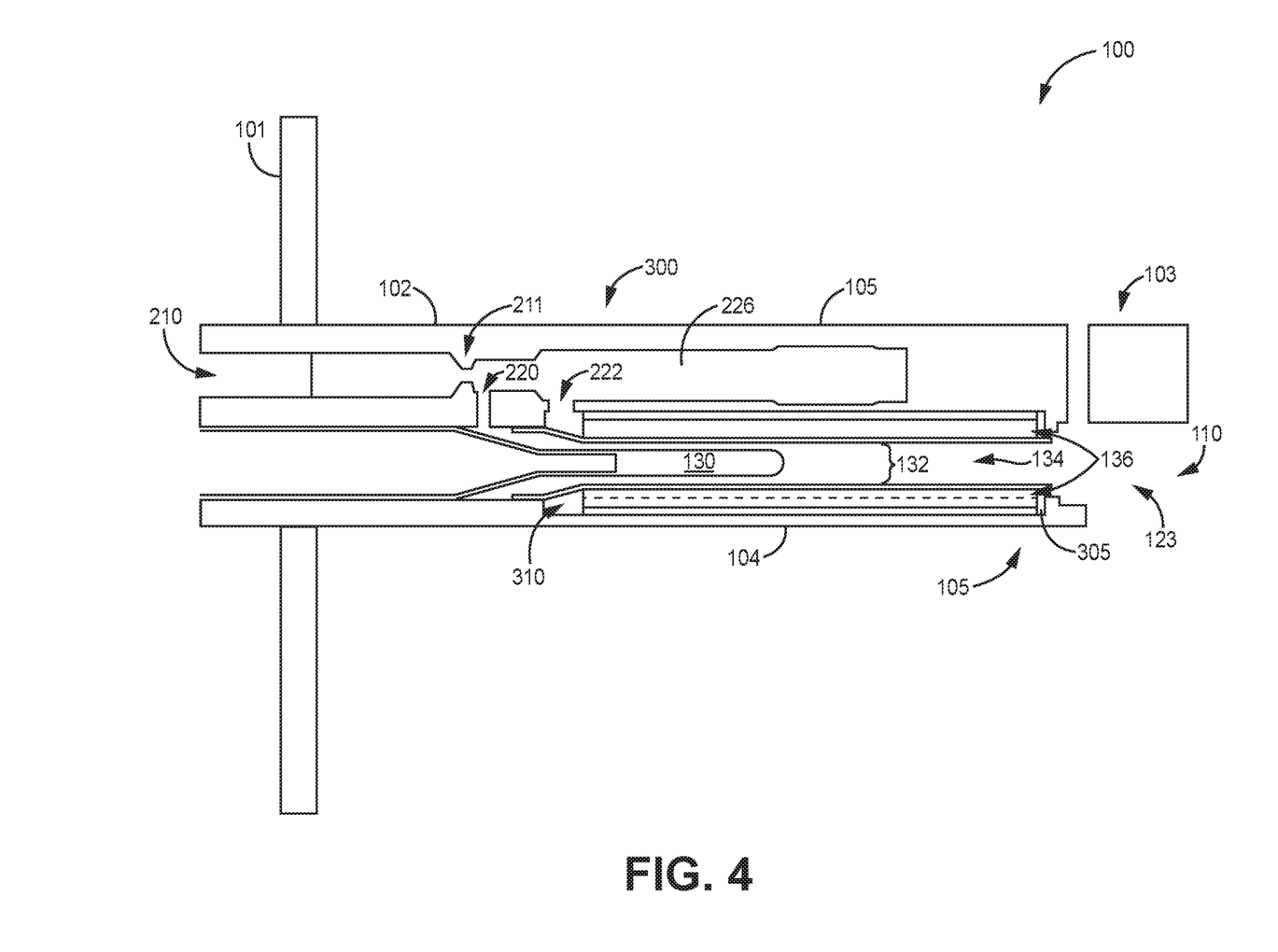
FIG. 4 is a side cross-sectional side view of the TAT probe of FIG. 3.

A first airflow passage directs air entering intake aperture 123 through a first concentric inlet passage 134, across a temperature sensor element 130, and then out of the probe body 102 from one or more exhaust ports 112 (illustrated in FIG. 3). The first concentric inlet passage 134 is formed between the sensor element 130 and a tubular heat shield 132 in this example. The first concentric inlet passage 134 extends from the distal end to the sensor element 130. The tubular heat shield 132 is open to the intake aperture 123 at its first end. The second end of the tubular heat shield 132 is open to an ejector first secondary passage 220 into a low pressure chamber 226. Air entering through the intake aperture 123 and into the first end of the tubular heat shield 132 thus flows over the temperature sensor element 130 before exiting the ejector first secondary passage 220 and one or more exhaust ports 112. In one embodiment, the exhaust ports 112 are positioned along a side of the probe body 102 where the velocity of passing air causes the air pressure at the exhaust ports 112 to be less than the air pressure at the leading edge 104, or less than the air pressure at the intake aperture 123. In other embodiments, they may be positioned elsewhere such as but not limited to the trailing edge 105 side of probe body 102.

Temperature sensor element 130 comprises a device that outputs an electrical signal that varies as a function of sensed temperature. The raw electrical signal may be sampled or otherwise converted into data representing total air temperature measurements which may be provided to various onboard avionics for various purposes.

In one embodiment, tubular heat shield 132 comprises a sheath of insulating material that blocks heat radiated by probe body heating element from radiating to either the temperature sensor element or the air flow being measured. It should be noted that although heat shield 132 is described as being "tubular," this description should not be interpreted to infer that it necessarily has a round or circular cross-section. Heat shield 132 may be implemented as a sheath having any other cross sectional shape, and may vary in size along different portions of its length. For example, in one embodiment, the tubular heat shield 132 and the first concentric inlet passage 134 which its interior defines, may vary in shape to follow a contour of the temperature sensor element 130.

In one embodiment, a second airflow passage directs air entering intake aperture 123 through a second concentric inlet 136, across heating element 310, and then through an ejector secondary inlet 222 into the low pressure chamber 226 and, in an embodiment, through the probe body 102 from one or more exhaust ports 113. In one embodiment, the exhaust ports 113 are positioned along a side of the probe body 102 where the velocity of passing air causes the air pressure at the exhaust ports 113 to be less than the air pressure at the leading edge 104, or less than the air pressure at the intake aperture 123. In other embodiments, they may be positioned elsewhere such as but not limited to the trailing edge 105 side of probe body 102. The second concentric inlet 136 is formed between the tubular heat shield 132 and an interior wall of the probe body 102 and as such defines a passage where air flow across the exterior of the tubular heat shield 132.

Heating element 310 heats the air that passes through the second concentric inlet 136, which heated internal airflow may be used to dissipate heat to keep various portions of the probe warm. Heating element 310 also conductively heats the thermal mass of the probe body 102 including the notched intake port 110. That is, the probe body 102 provides a conductive thermal path from the heating element 130 to the notched intake port 110.

The heating element 310 is made from a flexible a high PTC material having a low electrical resistance at low temperature and a high electrical resistance at high temperatures as discussed above. In this example embodiment, the heating element 310 is cylindrical in shape and is positioned within a cavity 305 formed by the heat shield 132 and body 102. A portion of the cavity 305 and heating element 310 in this example are position proximate a tip 105 of the TAT probe 100 in this embodiment. The tip 105 of the TAT probe includes the distal end of the probe including the intake aperture 123 and the area around the first concentric inlet passage 134 to the sensor element 130.

Heating element 310 is a restive heating element that dissipates heat generated by the flow of electrical current. The heating element 310 has low electrical resistance at low temperature and a high electrical resistance at high temperatures. Hence at low temperatures the flow of electrical current is greater which generates heat while a high temperatures the flow of current is reduced or even stopped. Accordingly, a basic feature of the heater material 310 is that it is self-limiting or self-protecting.

Figure 5:
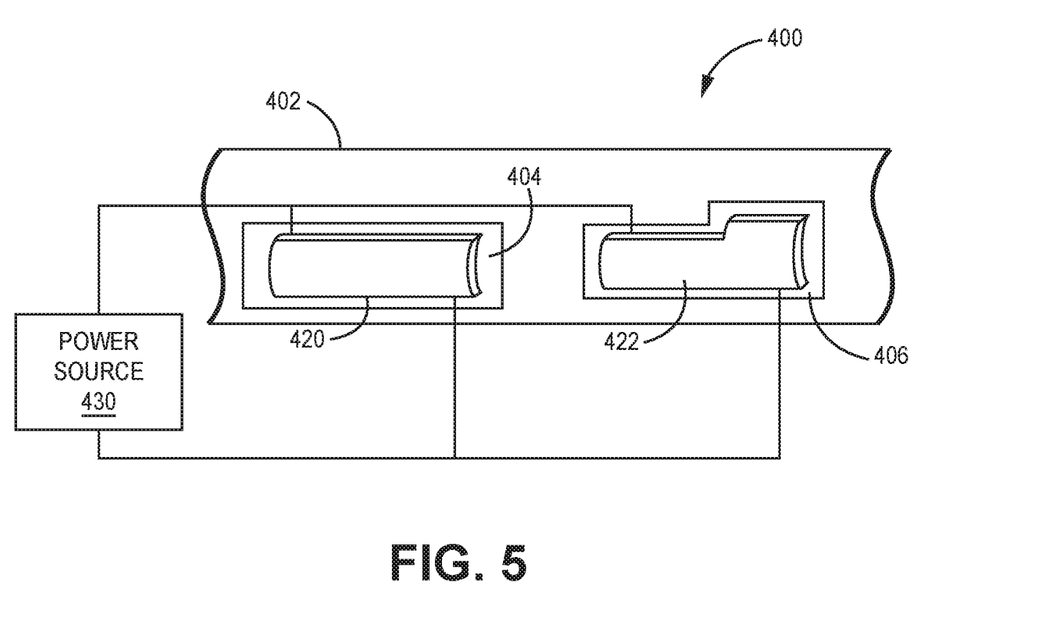
FIG. 5 is a block diagram of a heating element system in a partial view of a heated TAT probe according to an exemplary embodiment.

Referring to FIG. 5, a partial view of a heated TAT probe 400 showing a heating element system of an exemplary embodiment is provided. The partial TAT probe 400 is illustrated as including cavities 404 and 406 which contain heating elements 420 and 422. A power source 430 is coupled to pass current through the heating elements. Since the heating elements are made from high PTC material there is no need for control circuity to regulate the amount of current flowing through the heating elements to achieve a desired temperature since heating element 420 and 422 are self-regulating. As illustrated, the heating elements 420 and 422 can have any shape needed to achieve a desired heat source in a specific location within the probe 400. Moreover, have a flexible heating element 420 and 422 allows the heating elements to conform to spaces within the cavities 404 and 406.

Further, the amount of heat generated at a specific location at specific temperatures can be achieved in embodiments with select compositions of the high PTC material of the heating elements and the size and shape of the heating elements. Moreover, as illustrated in FIG. 5, more than one heating element can be used in heating a TAT probe 400. Further, the heating elements may be positioned proximate each other. Moreover, heating elements that provide different amount of heat generation may be positioned in close proximity to each other. For example, it may desirable to generate higher heating at an intake aperture than closer to a sensor element. This can be accomplished by either using at least two different heating elements having high PTC material of select compositions or sizes and shapes that generate different amounts of heat. In another embodiment, this situation can be addressed by changing the size and shape of a single heating element so it generates different heat amounts at different locations of the heating element.

Figure 6:
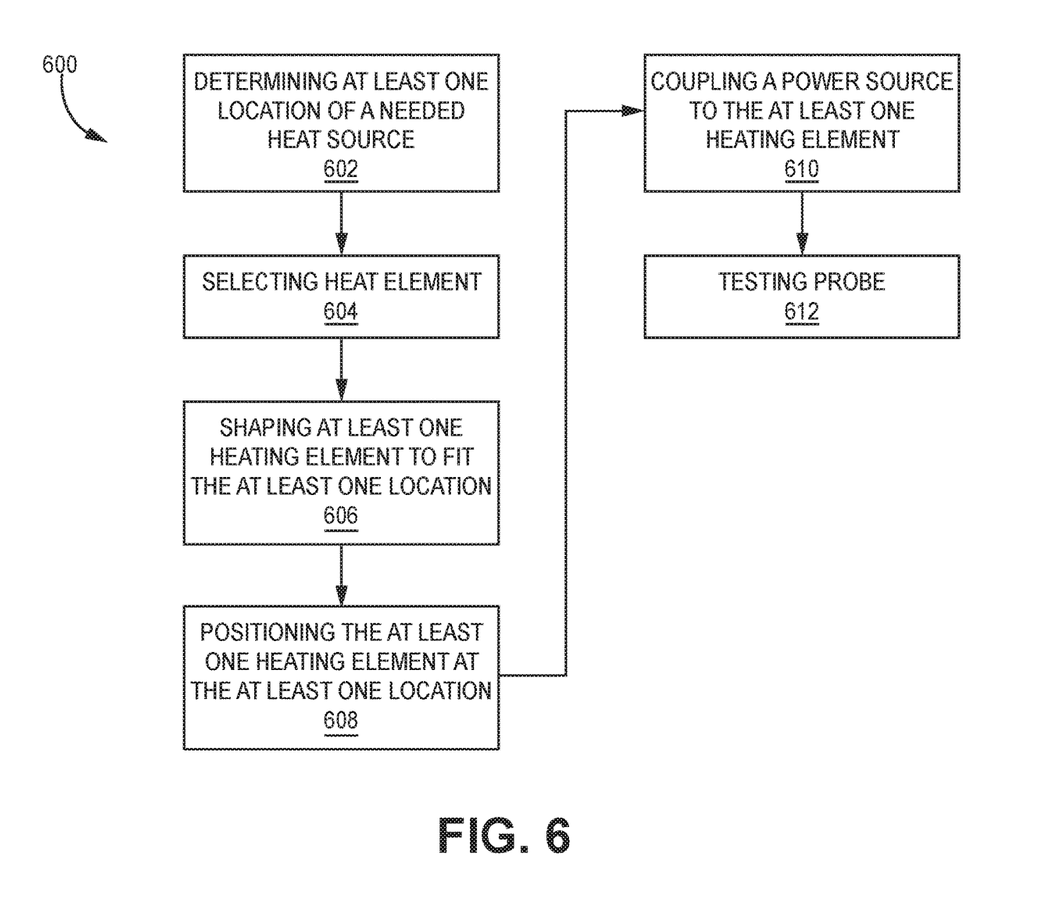
FIG. 6 includes a formation flow diagram according to an exemplary embodiment.

FIG. 6 illustrates a formation flow diagram 600 of a self-regulating heating system for a temperature probe of an example embodiment. The formation flow diagram 600 is provide as a sequence of sequential steps. The sequence of steps may occur in another order. Hence, embodiments are not limited to the sequence of steps set out in FIG. 6.

The formation flow diagram 600 begins by determining where in a temperature sensing probe heating is needed to prevent icing at step (602). This may include determining at least one location within the probe that is in need of a heat source. In making the determination, the effect of a heat source at the determined locations on one or more sensor elements of the probe during operation must be considered. The composition of the high PTC material for the heat element is determined at step (604). The composition is based at least in part of the heat needed to be generated and the resistive properties relating to temperature.

Each heat element to be used is shaped to fit a cavity in the probe at step (606). In one embodiment this done by cutting the heat element to the desired shape. Each heating element is then positioned with an associate cavity within the probe at step (608). The shaping and positioning of the heat element is aided when using a flexible heat element. Power is then coupled to each heat element at step 610. Since the heat element is self-regulating, once power is connected or turned on, current will only pass through the heat element at the desired low temperatures to create heat to prevent icing. Further steps may include testing the temperature probe before installation to unsure heating elements are functioning properly as indicated by step (612).

Example Embodiments

Example 1 is a total air temperature (TAT) probe having a self-regulating heating system that includes a TAT probe, a heating element and a power source. The TAT probe housing includes at least one heating cavity. The at least one heating cavity includes a heating cavity that is located proximate to a tip of the TAT probe. The heating element is received within the at least one heating cavity. The heating element is composed from a flexible material with a very high positive temperature coefficient (PTC) that provides non-linear resistance with temperature with generally relatively low electrical resistances at temperatures below freezing and relatively high electrical resistances above freezing. The power source is coupled to the heating element. The very high PTC material of the heating element causes less power drawn by the heating element from the power source at higher temperatures above freezing than the power drawn by the heating element from the power source at lower temperatures below freezing to maintain a desired temperature of the TAT probe.

Example 2, includes the TAT probe having a self-regulating heating system of Example 1, wherein the heating element has a cylinder shape.

Example 3 includes the TAT probe having a self-regulating heating system of any of the Examples 1-2, wherein the heating element is made from a thin foil of PTC elastomeric material.

Example 4 includes the TAT probe having a self-regulating heating system of any of the Examples 1 and 3, wherein the heating element has an arbitrary shape.

Example 5 includes the TAT probe having a self-regulating heating system of any of the Examples 1-4, wherein the heating element is positioned at least partially around an inlet passage that leads to a sensor element.

Example 6 includes the TAT probe having a self-regulating heating system of any of the Examples 1-5, further including a heat shield that defines an inlet passage to a sensor element. The heat shield further defines a portion of the heating cavity.

Example 7 includes a TAT probe having a self-regulating heating system including temperature sensor element, a TAT probe housing, at least one heating element and at least one power source. The TAT probe housing contains the temperature sensor element. The TAT probe housing includes a distal end. The TAT probe housing has an inlet passage extending from the distal end of the TAT probe to the sensor element. The TAT probe further has at least one heating cavity. One heating cavity of the at least one heating cavity is positioned at least partially around the inlet passage. The at least one heating element is positioned within the at least one heating cavity. The at least one heating element is formed from a flexible material with a very high positive temperature coefficient (PTC) providing non-linear resistance with temperature with generally relatively low electrical resistances at temperatures below freezing and relatively high electrical resistances above freezing. The at least one power source is coupled to provide a current flow through the at least one heating element as allowed by the at least one heating element.

Example 8, includes the TAT probe having a self-regulating heating system of Example 7, wherein the at least one heating element has a cylinder shape.

Example 9 includes the TAT probe having a self-regulating heating system of any of the Examples 7-8, wherein the heating element is made from a thin foil of PTC elastomeric material.

Example 10 includes the TAT probe having a self-regulating heating system of any of the Examples 7 and 8-9, wherein the at least one heating element has an arbitrary shape.

Example 11 includes the TAT probe having a self-regulating heating system of any of the Examples 7-10, further including a heat shield defining the inlet passage to a sensor element, the heat shield further defining a portion of the heating cavity.

Example 12 includes the TAT probe having a self-regulating heating system of any of the Examples 7-11, wherein the at least one heating element includes at least two heating elements. Each of the at least two heating elements are configure to generate different heating outputs.

Example 13 includes the TAT probe having a self-regulating heating system of Example 12, wherein the at least two different heating elements have different sizes.

Example 14 includes the TAT probe having a self-regulating heating system of Example 12, wherein the at least two different heating elements have different shapes.

Example 15 includes the TAT probe having a self-regulating heating system of Example 12, wherein the at least two different heating elements are position within the same heating cavity.

Example 16 includes the TAT probe having a self-regulating heating system of Example 12, wherein the at least two different heating elements are made from different compositions.

Example 17 is a method for forming a TAT probe having a self-regulating heating system. The method includes shaping at least one heating element having a flexible material with a very high positive temperature coefficient (PTC) providing non-linear resistance with temperature with generally relatively low electrical resistances at temperatures below freezing and relatively high electrical resistances above freezing. The at least one heating element is positioned in at least one cavity in a housing of the TAT probe. One of the at least one cavity is positioned adjacent an inlet passage extending from a distal end of the housing of the TAT probe to a sensor element. At least one power source is coupled to the at least one heating element.

Example 18 includes the method of Example 17, further includes determining at least one location for the at least one cavity in a housing of the TAT probe that needs a heat source.

Example 19 includes the method of any of the examples 17-18, further including selecting the at least one heating element based on the heat source needed at the at least one location.

Example 20, includes the method of any of the examples 17-20, further including testing the heating of the TAT probe provided by the at least one heating element.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A total air temperature (TAT) probe having a self-regulating heating system comprising:
   a TAT probe housing including at least one heating cavity, the at least one heating cavity including a heating cavity proximate to a tip of the TAT probe;
   a heating element received within the at least one heating cavity, the heating element composed from a flexible material with a positive temperature coefficient (PTC), a composition of the heating element being varied to provide a non-linear resistance within a working area above freezing so the heating element is self-regulating and self-limiting at locations across an active surface to provide a heater control that is intrinsic to the heating element;
   a power source coupled to the heating element, wherein the flexible material with the PTC causes less power drawn by the heating element from the power source at temperatures above freezing within the working area than the power drawn by the heating element from the power source at temperatures below freezing to maintain a desired temperature of the TAT probe;
   a heat shield defining an inlet passage to a sensor element, the heat shield further defining a portion of the at least one heating cavity, the heat shield further positioned to block heat radiated by the heating element to the sensor element and an air flow measured by the sensor element; and
   the TAT probe housing further having an airflow passage to direct air flow across the heating element received within the at least one heating cavity.

2. The TAT probe having a self-regulating heating system of claim 1, wherein the heating element has a cylinder shape.

3. The TAT probe having a self-regulating heating system of claim 1, wherein the heating element is made from a thin foil of PTC elastomeric material.

4. The TAT probe having a self-regulating heating system of claim 1, wherein the heating element has an arbitrary shape.

5. The TAT probe having a self-regulating heating system of claim 1, wherein the heating element is positioned at least partially around an inlet passage that leads to a sensor element.

6. The TAT probe having a self-regulating heating system of claim 1, wherein the at TAT probe housing includes at least one ejector secondary inlet and at least one low pressure chamber, the at least one ejector secondary inlet providing a path for the air flow out of the at least one cavity into the at least one low pressure chamber.

7. A total air temperature (TAT) probe having a self-regulating heating system comprising:
   a temperature sensor element;
   a TAT probe housing containing the temperature sensor element, the TAT probe housing including a distal end, the TAT probe housing having an inlet passage extending from the distal end of the TAT probe to the sensor element, the TAT probe further having at least one heating cavity, one heating cavity of the at least one heating cavity positioned at least partially around the inlet passage;
   at least one heating element positioned within the at least one heating cavity, the at least one heating element formed from a flexible material with a positive temperature coefficient (PTC), a composition of the at least one heating element being varied to provide a non-linear resistance with temperature within a working area so the at least one heating element is self-regulating and self-limiting at locations across an active surface to provide a heater control that is intrinsic to the heating element;
   a heat shield defining an inlet passage to the temperature sensor element, the heat shield further defining a portion of the at least one heating cavity, the heat shield further positioned to block heat radiated by the heating element to the temperature sensor element and an air flow measured by the temperature sensor element;
   the TAT probe housing further having an airflow passage to direct air flow across the at least one heating element received within the at least one heating cavity; and
   at least one power source coupled to provide a current flow through the at least one heating element as allowed by the at least one heating element.

8. The TAT probe having a self-regulating heating system of claim 7, wherein the at least one heating element has a cylinder shape.

9. The TAT probe having a self-regulating heating system of claim 7, wherein the heating element is made from a thin foil of PTC elastomeric material.

10. The TAT probe having a self-regulating heating system of claim 7, wherein the at least one heating element has an arbitrary shape.

11. The TAT probe having a self-regulating heating system of claim 7, wherein the at TAT probe housing includes at least one ejector secondary inlet and at least one low pressure chamber, the at least one ejector secondary inlet providing a path for the air flow out of the at least one cavity into the at least one low pressure chamber.

12. The TAT probe having a self-regulating heating system of claim 7, wherein the at least one heating element includes at least two heating elements, each of the at least two heating elements configured to generate a different heating output.

13. The TAT probe having a self-regulating heating system of claim 12, wherein the at least two different heating elements have different sizes.

14. The TAT probe having a self-regulating heating system of claim 12, wherein the at least two different heating elements have different shapes.

15. The TAT probe having a self-regulating heating system of claim 12, wherein the at least two different heating elements are position within the same heating cavity.

16. The TAT probe having a self-regulating heating system of claim 12, wherein the at least two different heating elements are made from different compositions.

17. A method for forming a total air temperature (TAT) probe having a self-regulating heating system, the method comprising:

shaping at least one heating element having a flexible material with a positive temperature coefficient (PTC) having a composition that is varied to provide a non-linear resistance with temperature within a working area above freezing to form a heating element that is self-regulating and self-limiting at locations across an active surface to provide a heater control that is intrinsic to the heating element;

positioning the at least one heating element in at least one heating cavity in a housing of the TAT probe, one of the at least one heating cavity being positioned adjacent an inlet passage extending from a distal end of the housing of the TAT probe to a sensor element;

defining an inlet passage with a heat shield to a temperature sensor element of the TAT probe, the heat shield further defining a portion of the at least one heating cavity, the heat shield further positioned to block heat radiated by the at least one heating element to the temperature sensor element and an air flow measured by the temperature sensor element;

providing at least one airflow passage in the housing of the TAT probe to direct air flow across the at least one heating element received within the at least one heating cavity; and coupling at least one power source to the at least one heating element.

18. The method of claim 17, further comprising:

determining at least one location for the at least one cavity in a housing of the TAT probe that needs a heat source, wherein one of the at least one location positions a heat shield between the at least one heating element and a temperature sensor element.

19. The method of claim 17, further comprising:

selecting the at least one heating element based on the heat source needed at the at least one location.

20. The method of claim 17, further comprising:

testing the heating of the TAT probe provided by the at least one heating element.

* * * * *